United States Patent [19]

Larnac et al.

[11] Patent Number: 5,232,877
[45] Date of Patent: Aug. 3, 1993

[54] GLASS-CERAMIC LI-AL-SI-O COMPOSITION AND PROCESS FOR ITS PRODUCTION

[75] Inventors: Guy Larnac, Montpellier; Jean Phalippou, Montferrier/Lez; Michel Parlier, Bretonneux; Marie-Héléne Ritti; Jean Jamet, Bouliac, all of France

[73] Assignee: Office National d'Etudes et de Recherches Aerospatiales, Sous Bagneaux, France

[21] Appl. No.: 860,610

[22] Filed: Mar. 30, 1992

Related U.S. Application Data

[62] Division of Ser. No. 708,276, May 31, 1992, abandoned.

[30] Foreign Application Priority Data

Dec. 4, 1987 [FR] France ............... 89 15987

[51] Int. Cl.$^5$ ............... C03C 10/04; C03C 14/00
[52] U.S. Cl. ............... 501/7; 501/9; 501/12; 501/32; 501/95; 264/65; 264/66
[58] Field of Search ............... 501/7, 9, 12, 32, 17, 501/95; 264/65, 66

[56] References Cited

U.S. PATENT DOCUMENTS

| | | |
|---|---|---|
| 3,791,808 | 2/1974 | Thomas . |
| 4,042,403 | 8/1977 | Reade . |
| 4,142,879 | 3/1979 | Fritsch et al. . |
| 4,588,699 | 5/1986 | Brennan et al. ............ 501/9 |
| 4,608,215 | 8/1986 | Gonczy et al. ............ 501/12 X |
| 4,769,346 | 9/1988 | Gadkavee et al. ............ 501/9 |
| 4,788,162 | 11/1988 | Hillig ............ 501/7 X |
| 4,853,350 | 8/1989 | Ohea et al. ............ 501/9 |
| 4,857,485 | 8/1989 | Brennan et al. ............ 501/7 |

FOREIGN PATENT DOCUMENTS

| | | |
|---|---|---|
| 0233732 | 8/1987 | European Pat. Off. . |
| 0235624 | 9/1987 | European Pat. Off. . |
| 0322295 | 6/1989 | European Pat. Off. . |
| 0327783 | 8/1989 | European Pat. Off. . |

OTHER PUBLICATIONS

Journal of Non-Crystalline Solids, vol. 82, No. 1/3, Jun. 1986, "Synthesis and Preliminary Processing of the Sol-Gel Derived $\beta$-Quartz Lithium Aluminum Silicates", pp. 329-342.

Journal of Materials Science Letters, vol. 6, No. 10, Oct. 1987, "Low-Temperature Cordierite Glass from Autoclave-Prepared Gel", pp. 1187-1189.

Powers et al., "SiC Fiber-Reinforced Glass-Ceramic Composites in the Zirconia/Magnesium Aluminosilicate System," Ceramic Engineering and Science Proceedings, vol. 7 (1986) Jul.-Aug., Nos. 7-8, pp. 969-977.

Primary Examiner—Karl Group
Attorney, Agent, or Firm—Armstrong, Westerman, Hattori, McLeland & Naughton

[57] ABSTRACT

In the process according to the invention, a gel is prepared by hydrolysis and polycondensation of precursor compounds which comprise at least silicon alcoholate and aluminum alcoholate and inorganic compounds of lithium and/or magnesium, the solvent is removed, and the gel obtained is subjected to a heat treatment resulting in dehydration and oxidation, then to compacting and ceramisization.

The composition obtained is substantially in the form of solid ceramic solutions, such as $\beta$-spodumene, cordierite and mullite.

17 Claims, No Drawings

GLASS-CERAMIC LI-AL-SI-O COMPOSITION AND PROCESS FOR ITS PRODUCTION

This application is a division of application Ser. No. 708,276 filed May 31, 1992, now abandoned.

The invention relates to glass-ceramic compositions based on silica, alumina and lithium oxide, it being possible for the last-mentioned to be replaced completely or in part by magnesium oxide.

The compositions of this type are conventionally obtained by fusing oxides and/or carbonates. Some time ago, another route called sol-gel was discovered, which is based on a hydrolysis and polycondensation reaction in dissolved medium of precursor compounds, of which at least the aluminum and silicon compounds are alcoholates, with the formation of a sol, then of a gel, which is followed by a heat treatment at elevated temperature.

This sol-gel route has several advantages compared with the conventional route: the product is purer, more homogeneous and has a more accurate composition due to the absence of evaporation loss. The expenditure of energy is reduced, since the temperature used is lower. The composition obtained, which, if necessary, is ground in order to eliminate agglomerates, yields a powder of large and specific surface area and very reactive, enabling dense pieces, i.e. of low or zero porosity, to be produced more easily.

The object of the invention is to provide such a glass-ceramic composition obtained by the sol-gel route, which has a low thermal expansion coefficient and can therefore tolerate without harm large or rapid variations in temperature (thermal shocks) when it is in the form of a dense piece.

Another object of the invention is to provide a composition of this type which is suitable in particular for forming the matrix of fiber-reinforced ceramic composite materials.

The invention provides a glass-ceramic composition whose main components are $SiO_2$, $Al_2O_3$ and $Li_2O$ and/or MgO and which is obtained by the sol-gel route from silicon alcoholate: and aluminum alcoholate and lithium compounds and/or magnesium compounds, which composition is substantially in the form of solid ceramic solutions, such as $\beta$-spodumene, cordierite and mullite.

It has been found that when the glass-ceramic composition is substantially in the form of such solid solutions, which themselves have a low expansion coefficient, it does not give rise to phase transitions due to an increase in temperature, except for the conversion of a glass phase which may still remain into a solid solution so that as a whole it has a low expansion coefficient. This low expansion coefficient and other properties of the composition also favor the formation of composite materials with fiber reinforcements, which have good thermomechanical characteristics.

The basic formulae for $\beta$-spodumene, cordierite and mullite are $Al_2O_3 \cdot Li_2O \cdot 4SiO_2$, $2MgO \cdot 2Al_2O_3 \cdot 5SiO_2$ and $2SiO_2 \cdot 3Al_2O_3$, respectively. Since they are solid solutions, the composition of these phases can of course deviate from these formulae.

Apart from the main components indicated above, the composition according to the invention can contain at least one component chosen from BaO, $Nb_2O_5$ and $B_2O_3$, this list being non-limiting. The effect of such additives is especially that they modify certain properties of the composition, and/or the composite materials which it makes it possible to obtain, as a function of the intended application.

The production of the structure according to the invention depends on several factors, one of which is of course the chemical formula of the composition which has to be compatible with the predominant presence and stability of at least one solid solution. One skilled in the art can easily determine by means of the phase diagram of the system in question whether an envisaged formula may be suitable in this respect.

The inventors have found that this is the case in particular for a composition comprising ax·b mol of $Li_2O$, c mol of $SiO_2$, b mol of BaO and a(l-x) mol of MgO per mole of $Al_2O_3$, it being possible for a, b, c and x to vary from 0.4 to 1, 0 to 0.1, 3 to 8 and 0 to 1, respectively.

The structure according to the invention likewise implies a development process which avoids maintaining an amorphous glass phase, likewise avoids the appearance of damaging crystalline phases, such as cristobalite, and furthermore allows complete conversion of the eucryptite by a heat treatment.

To this end, the invention proposes a process for the production of a composition such as defined above, which comprises the following steps:

a) preparation of a gel by hydrolysis and polycondensation of precursor metal compounds in solution in a solvent:

b) removal of the solvent;

c) grinding of the gel, if necessary; and d) dehydration and oxidation of the gel as well as compaction and ceramisization, by increasing the temperature.

The precursors used are preferably silicon alcoholates and aluminum alcoholates, more particularly tetraethyl orthosilicate and aluminum sec-butoxide, and inorganic compounds of lithium and/or magnesium and, if the case arises, of barium and niobium, more particularly lithium nitrate and/or magnesium nitrate, and, if the case arises, barium nitrate and niobium chloride.

Step a) is advantageously divided into two phases:

a1) prehydrolysis of the silicon alcoholate by a portion of the total hydrolysis water; and a2) reaction of the product from phase a1) with the other precursors and the remainder of the hydrolysis water.

Step d) can also be divided into two phases:

d1) oxidation by gradual heating in air over a period of several hours up to a temperature of about 500° C.; and d2) compaction and ceramisization treatment first at a temperature at the most slightly above the fusing temperature of the composition.

The dehydration and oxidation phase yields, after grinding, a powder which has a large specific surface area, is particularly reactive and can easily and efficiently be compacted.

This compaction can be achieved by subjecting the composition in the form of a powder to pressing during the ceramisization treatment.

When the piece exhibits a glass phase after the compaction and ceramisization treatment, this phase can be converted into a solid ceramic solution by a second heat treatment at a temperature slightly below the fusing temperature of the composition.

In order to obtain a fiber-reinforced composite material with refractory ceramic matrix, the fibers can be incorporated in the powder of the glass-ceramic composition before the compacting heat treatment. This procedure is applied in particular to fibers based on silicon carbide.

When the silicon carbide fibers contain an appreciable amount of oxygen and carbon on the surface, the glass-ceramic composition preferably contains at least one component other than $SiO_2$, $Al_2O_3$ and $Li_2O$, for example $Nb_2O_5$, intended to limit adhesion of the composition to the fibers.

Other characteristics and advantages of the invention will become evident from the detailed description given below of a few exemplary embodiments.

First of all, the preparation method of the gel will be described. Only the list of precursor compounds and their quantities vary from one example to the next as a function of the formula of the composition to be prepared.

These precursors are:
tetraethyl orthosilicate $Si(OC_2H_5)_4$ (TEOS)
aluminum sec-butoxide $Al(OCH(CH_3)C_2H_5)_3$(ASB)
lithium nitrate $LiNO_3$ and, if the case arises,
magnesium nitrate $Mg(NO_3)_2.6H_2O$, containing 42.2% by weight of water
barium nitrate $Ba(NO_3)_2$
niobium chloride $NbCl_5$.

The solvent chosen, which is the same for the precursors and the hydrolysis water, is isopropanol.

Nitric acid is added in the form of a 70% by weight aqueous solution, which has the effect that precipitation of AlOOH in the course of hydrolysis is prevented and which favors the preparation of a microporous gel exhibiting high reactivity on sintering.

Isopropyl alcohol is used in an amount of 10 mol per 1 mol of TEOS and the nitric acid in an amount of 0.2 mol per 1 mol of TEOS.

The amount of prehydrolysis water, which includes that brought in by isopropanol and nitric acid, is 1 mol per mole of TEOS. The remaining amount of hydrolysis water, which includes that brought in by isopropanol and, if the case arises, by magnesium nitrate, is 3 mol per mole of ASB plus 4 mol per mole of TEOS.

TEOS, half of the solvent, the prehydrolysis water and the nitric acid are introduced with stirring into a three-neck reactor equipped with a heating mantle, a stirrer and a distillation column. The mixture is refluxed (82° C.) for 30 minutes.

The purpose of this prehydrolysis phase is to avoid preferential hydrolysis of ASB with precipitation of AlOOH, which would take place if TEOS, ASB and water were to be brought together at the same time, due to the low reactivity of TEOS. In the course of this phase, TEOS is partially hydrolyzed according to the reaction:

$$Si(OR)_4 + H_2O \rightarrow Si(OR)_3OH + ROH$$

and the product of partial hydrolysis will react with the other precursors in the following phase.

At the end of the abovementioned 30 minutes, the temperature of the reactor is lowered by 10° C. in order to interrupt the refluxing. The ASB fluidized by dilution in a small amount of isopropanol is then added in small quantities (four or five portions). Reflux is then continued for another 45 minutes. Heating is then discontinued, and lithium nitrate and, if the case arises, magnesium nitrate, dissolved in the remaining isopropanol, are introduced with continued stirring.

When the mixture reaches ambient temperature, the hydrolysis water is added, in which, if the case arises, the barium nitrate is dissolved, and the mixture is stirred for another 5 to 10 minutes in order to obtain a homogeneous sol, which is introduced into sealed containers. A gel is formed within a few hours at 45° C. or overnight at ambient temperature. After gelling, the containers are opened and kept in an oven at 90° C. for 24 to 48 hours in order to evaporate the solvent. The gel is then, if necessary, ground in order to eliminate agglomerates and treated in a through-circulation oven for the oxidation step which leads to the glass-ceramic composition.

The following heat cycle is suitable in particular for this step: heating at 3° C./min from ambient temperature to 250° C. and at 10° C./min from 250 to 500° C. holding at temperature for 4 hours every 50° C. from 250 to 500° C., then cooling at a rate of 20° C./min down to ambient temperature. However, this cycle can be simplified by omitting certain temperature-holding stages. This gives a very reactive amorphous powder having a specific surface area of about 300 m$^2$/g. This powder is advantageously redispersed in a mill containing zirconium dioxide beads in order to break up the agglomerates of individual grains and screened so as to retain only the grains of diameter below 50 μm.

EXAMPLE 1

Composition $Li_2O$-$Al_2O_3$-$SiO_2$

The gel is prepared, then dehydrated and oxidized, and the resulting composition is ground and screened as just described, using amounts of precursors corresponding to the final formula 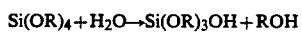. In order to obtain a compact ceramic sintered piece, the powder obtained is subjected to a compacting and ceramisization heat treatment in the solid state, which is carried out under a vacuum for complete removal of water and in which the powder is pressed under a pressure of 35 MPa. The heat cycle used is as follows: heating at 20° C./min up to 500° C., followed by holding at this temperature for 60 min; heating at 10° C./min from 500 to 1300° C., interrupted by holding at 780° C. for 20 min; cooling at 30° C./min down to ambient temperature.

The density of the product obtained is 2.5 with a closed porosity of 1% measured by immersion in water. The composition is made of β-spodumene and mullite, and its average expansion coefficient between 20 and 1000° C. is $2.0 \cdot 10^{-7}$/° C.

The breaking stress σ, the modulus of elasticity E and $K_1C$ taken from the PARIS polynomial formulae, which were determined by the three-point bending test, are as follows:

σ = 111 MPa
E = 80 GPa
$K_1C = 1.45$ MPa·m$^{\frac{1}{2}}$

For σ and E, the force is applied perpendicularly to the direction of the pressing of the powder. The distance between supports is 16 mm and length/thickness ratio is equal to 15. For $K_1C$, the force is applied perpendicularly to the direction of pressing. The distance between supports is 15 mm, the notch depth 0.9 mm and its width 70 μm. The height/notch depth ratio is 4, and the ratio of distance between supports to height is equal to 4.17. The rate of descent is 0.2 mm/min. These test conditions are likewise valid for the examples which follow, unless stated otherwise.

EXAMPLE 2

Composition $Li_2O$-$Al_2O_3$-$SiO_2$-$Nb_2O_5$

The amounts of reactants are the same as in Example 1, niobium chloride being added in such an amount that the final composition contains 3% by weight of $Nb_2O_5$. The compacting and ceramisization heat treatment is carried out above the fusing temperature of the composition, the latter having the property of recrystallizing in a homogeneous manner in the form of solid solutions without addition of nucleating agents and after partial or complete fusing of the crystalline phases developed in the course of the first heat treatment. In order to avoid the formation of porosity as a result of the presence of combined residual water at the time of fusing, it is necessary to completely eliminate this water beforehand.

To this end, the product is treated, after dehydration and oxidation, with ammonia at 500° C. (grinding and screening, if necessary, having been carried out beforehand). The powder is first maintained at 320° C. under nitrogen for 4 hours, in order to eliminate the water adsorbed on the surface. It is then flushed with ammonia, and the temperature is increased to 600° C. at a rate between 1 and 3° C./min, in order to replace the remaining OH groups by nitrogen-containing groups. Heating under nitrogen is continued at a rate of 10° C./min up to 1200° C. The powder is then placed in a press and heated to 1000° C. at a rate of 10° C./min. At this temperature, a mechanical pressure between 16 and 35 MPa is applied while heating the powder at a rate of increase of 5° C./min, during which the thickness of the product is monitored by means of a displacement transducer.

When the temperature reaches 1330° C. a decrease in thickness indicates the beginning of compaction. This temperature is kept constant until the thickness stabilizes, for example for 3 minutes. The composition then has a viscosity of about $1.5 \cdot 10^9$ Pa.s. The pressing is interrupted and the product is cooled to ambient temperature.

The product obtained has no detectable porosity. It is mainly made up of β-spodumene and mullite with a small fraction of amorphous phase. Infrared spectography shows the absence of water, while the same method shows the presence of 224 ppm of water for the composition from Example 1. Nor was any presence of nitrogen detected.

The product has the following properties:
$\alpha_{20}^{1000} = 2.41 \cdot 10^{-6}$/° C.
$\sigma = 128$ Mpa
$E = 96$ GPa σ and E having been determned as in Example 1.

Reheating at 1250° C. for 5 minutes enables the amorphous phase to be made to disappear. The following properties are then obtained:
$\alpha_{20}^{1000} = 2.15 \cdot 10^{-6}$/° C.
$\sigma = 137$ MPa
$E = 106$ GPa.

EXAMPLE 3

Composition $Li_2O$-$Al_2O_3$-$SiO_2$+short fibers 3 composite materials containing 5%, 10% and 20% by volume, respectively, of silicon carbide whiskers marketed by SUMITOMO are prepared.

The dehydrated and oxidized glass-ceramic powder is prepared as in Example 1, then dispersed under ultrasound in an isopropyl alcohol bath containing 5% by volume of nitric acid for stabilizing the suspension. The latter is vigorously agitated, and the fibers likewise dispersed under ultrasound in isopropyl alcohol are added. The mixture obtained is agitated for another 15 minutes under ultrasound, then filtered through a filter made of glass microfibres capable of retaining particles of a diameter of greater than 0.5 μm.

The compacting and ceramisization treatment is carried out under the conditions below: increase in temperature by 20° C./min up to 450° C. under vacuum, followed by holding this temperature for 45 min; continuation of the heating at 10° C./min up to 1000° C. under nitrogen with pressing under 16 MPa and holding at 780° C. for 20 min; continuation of the increase at 20° C./min up to 1300° C. under nitrogen and pressing at 16 MPa.

The table below gives the properties of the composite materials obtained as a function of the amount by volume of the fibers Vf.

| Vf % | Closed porosity % | Open porosity % | σ MPa | E GPa | $K_1C$ MPa.m$^{\frac{1}{2}}$ |
| --- | --- | --- | --- | --- | --- |
| 5 | 9.8 | 4.6 | 99 | 70 | 1.55 |
| 10 | 1.4 | 4.1 | 164 | 105 | 2.05 |
| 20 | 1.9 | 1.23 | 278 | 135 | 2.94 |

The expansion coefficient for a Vf of 20% is $2.84 \cdot 10^{-6}$/° C. between 20° and 1000° C.

EXAMPLE 4

Composition $Li_2O$-$Al_2O_3$-$SiO_2$-BaO+short fibers

The glass-ceramic powder is prepared as in Examples 1 and 3, but the amount of lithium nitrate reduced and barium nitrate is added such that the formula of the glass-ceramic composition is 0.05 BaO-0.4 $Li_2O$-$Al_2O_3$-3 $SiO_2$. The purpose of introducing BaO is to stabilize the composition beyond 1000° C. by inhibiting the formation of cristobalite, which is a crystalline phase giving rise to a phase transition at about 300° C., which could lead to cracking.

The powder/whisker mixture is prepared as in the previous example at an amount by volume of 20%. The compacting and ceramisization treatment comprises fusing of the glass-ceramic composition: heating by 10° C./min under vacuum up to 980° C., holding for 30 minutes at 480° C. and for 15 min at 780° and 980° C.; continuation of the heating at 10° C./min under nitrogen with pressing at 16 MPa up to 1325° C., holding this temperature for 5 min; cooling at 30° C./min under nitrogen down to ambient temperature without pressing.

The composite material obtained has a relative density (apparent density/density of the completely dense compound) of 0.99, indicating excellent compaction. X-ray analysis shows the predominant presence of β-spodumene and mullite and a small amount of amorphous phase. At this stage, the material has the following properties:
$\sigma = 317$ MPa
$E = 136$ GPa
$K_1C = 3.07$ MPa.m$^{\frac{1}{2}}$
$\alpha_{20}^{1000} = 4.61 \cdot 10^{-6}$/20 C.

A subsequent heat treatment at 1280° C. in air makes it possible to resorb the glass phase and leads to the appearance of a new phase identified as being barium aluminosilicate (defined in the ASTM standard 12-926 under the name of hexacelsian). The composite material thus treated has an expansion coefficient between 20° and 1000° C. of $3.2 \cdot 10^{-6}$/° C., a density of 2.71 and remarkable mechanical properties:

$\sigma = 412$ MPa
$E = 130$ GPa
$K_1C = 2.98$ MPa/m$^{\frac{1}{2}}$

EXAMPLE 5

Composition MgO-Li$_2$O-Al$_2$O$_3$-SiO$_2$ + long fibers

A glass-ceramic powder having the following formula:

0.5 MgO - 0.5 Li$_2$O - Al$_2$O$_3$ - 4 SiO$_2$ is prepared.

The fibers used are long silicon carbide fibers produced by NIPPON CARBON under the reference NLM 202 and marketed by BROCHIER in the form of a bidirectional fabric under the reference E2140. The acrylic resin based coating of the fibres is removed by immersion of the fabric in a mixture of equal volumes of acetone and isopropyl alcohol, which is agitated every half hour for 15 minutes by means of an ultrasonic bath. The fabric is treated in this manner in two successive baths for two hours in each bath.

70 g of the glass-ceramic powder dehydrated and oxidized at 500° C. and deagglomerated through a screen of 50 μm are mixed with a viscous solution of 5 g of polymethyl methacrylate in 100 cm$^3$ of chlorobenzene. The suspension obtained is applied with a paintbrush in order to impregnate the fabric of fibers, after which the solvent is immediately evaporated, the polymer ensuring adhesion of the powder to the fibers. Several applications are carried out, followed by weighing, until an amount of powder between 80 and 90 mg per cm$^3$ of fabric is obtained. Five 70×70 mm sheets are cut from the web of tissue thus impregnated and stacked in a graphite mould which has the same cross-section in order to carry out the compaction and ceramisization heat treatment: increase in temperature by 20° C./min up to 960°-980° C. under vacuum with a first 15-min holding of temperature at 350° C. in order to remove the polymethyl methacrylate, followed by a second 45-min holding of temperature at 450° C. which favours the rearrangement, continuation of the heating at 20° C./min under nitrogen up to 1310° C. and a 5-min holding of this temperature with pressing under 11 MPa; non-controlled cooling under nitrogen and without pressing.

The composite material obtained has a fiber volume proportion of 36% and an apparent density of 2.49 (relative apparent density of 0.99). X-ray analysis shows the predominant presence of β-spodumene and cordierite with a small amount of amorphous phase.

The fracture resistance determined by the threepoint bending test with a specimen 10 mm wide and 2.38 mm thick at a distance between supports of 50 mm is 290±35 MPa.

The above examples have no limiting character whatever. In particular, it is possible to combine differently, or to modify, the characteristics described, especially with respect to the formula of the glass-ceramic composition, the preparation method of the gel, the heat treatments of dehydration and oxidation as well as ceramisization, the presence or absence of fibers and their chemical nature and physical structure. More particularly, the use of silicon carbide fibers from other sources than those used in the examples, which have different surface properties, is taken into consideration.

We claim:

1. A process for the production of a ceramic composite material comprising fibers immersed in a fully ceramized glass-ceramic matrix of which the main components are SiO$_2$, Al$_2$O$_3$ and at least one oxide selected from the group consisting of Li$_2$O and MgO, and which may contain BaO as an optional compound, wherein said matrix is obtained by sol-gel route from a silicon alcoholate, an aluminum alcoholate and at least one mineral compound selected from the group consisting of mineral compounds of lithium, magnesium and barium, said silicon alcoholate, aluminum alcoholate and mineral compound serving respectively as a precursors of said main components and said optional component, wherein the process comprises the following steps:

a) preparation of a gel by hydrolysis and polycondensation of said precursors in solution in a solvent through prehydrolysis of the silicon alcoholate by a portion of the total hydrolysis water, and reaction of the so obtained hydrolysis product with the other precursors and the remainder of the hydrolysis water;

b) removal of the solvent from the gel thus obtained;

c) grinding of the gel, if necessary;

d) dehydration and oxidation of the gel by gradual heating in air over a period of several hours up to a temperature of about 500° C. for obtaining a glass-ceramic composition in powder form;

e) placing said powder in contact with said fibers; and f) compaction and ceramization of the product of step e) by heating at a first temperature under vacuum then under pressure at a second temperature higher than the first temperature, whereby a ceramic composite comprising fibers immersed in a fully ceramized glass-ceramic matrix is obtained.

2. The process as claimed in claim 1, wherein the silicon alcoholate is tetraethyl orthosilicate (TEOS) and the aluminum alcoholate is aluminum sec-butoxyde (ASB).

3. The process as claimed in claim 1, wherein the precursor of Li$_2$O, MgO or BaO is lithium nitrate, magnesium nitrate, or barium nitrate, respectively.

4. The process as claimed in claim 1, wherein the solvent is isopropyl alcohol.

5. The process as claimed in claim 1, wherein the compaction and ceramization treatment of step f) is followed by a heat treatment at a temperature slightly below the fusing temperature of the glass-ceramic composition, thereby converting any remaining glass phase into a solid ceramic solution.

6. The process as claimed in claim 1, wherein the fibers are based on silicon carbide.

7. The process as claimed in claim 6, wherein the fibers contain an appreciable amount of oxygen and carbon on the surface and the matrix contains at least one component selected from the group consisting of MgO and Nb$_2$O$_5$, in an amount sufficient to limit adhesion of the glass-ceramic composition to the fibers.

8. The process as claimed in claim 1, wherein step e) is performed by impregnating a fabric of long fibers by means of a suspension of said glass-ceramic composition in powder form in a viscous liquid, and step f) is performed on a stack of several sheets of fabric thus impregnated.

9. The process as claimed in claim 1, wherein said glass-ceramic matrix consists essentially of $SiO_2$, $Al_2O_3$, MgO and $Li_2O$.

10. A process for the production of a ceramic composite material comprising fibers immersed in a fully ceramized glass-ceramic matrix of which the main components are $SiO_2$, $Al_2O_3$ and at least one oxide selected from the group consisting of $Li_2O$ and MgO, and which may contain BaO as an optional component, wherein said matrix is obtained by sol-gel route from a silicon alcoholate, an aluminum alcoholate and at least one mineral compound selected from the group consisting of mineral compounds of lithium, magnesium and barium, said silicon alcoholate, aluminum alcoholate and mineral compound serving respectively as precursors of said main components and said optional component, wherein the process comprises the following steps:
   a) preparation of gel by hydrolysis and polycondensation of said precursors in solution in a solvent through prehydrolysis of the silicon alcoholate by a portion of the total hydrolysis water, and reaction of the so obtained hydrolysis product with the other precursors and the remainder of the hydrolysis water;
   b) removal of the solvent from the gel thus obtained;
   c) grinding of the gel, if necessary;
   d) dehydration and oxidation of the gel by gradual heating in air over a period of several hours up to a temperature of about 500° C. for obtaining a glass-ceramic composition in powder form;
   e) placing said powder in contact with said fibers;
   f) compaction and ceramization of the product of step e) by heating at a first temperature under vacuum, then under pressure at a second temperature higher than the first temperature; and
   g) heat treatment of the product of step f) at a temperature slightly below the fusing temperature of the glass-ceramic composition, thereby converting any remaining glass phase into a solid ceramic composition.

11. The process as claimed in claim 10, wherein the silicon alcoholate is tetraethyl orthosilicate (TEOS) and the aluminum alcoholate is aluminum sec-butoxyde (ASB).

12. The process as claimed in claim 10, wherein the precursor of $Li_2O$, MgO or BaO is lithium nitrate, magnesium nitrate, or barium nitrate, respectively.

13. The process as claimed in claim 10, wherein the solvent is isopropyl alcohol.

14. The process as claimed in claim 10, wherein the fibers are based on silicon carbide.

15. The process as claim in claim 14, wherein the fibers contain an appreciable amount of oxygen and carbon on the surface and the matrix contains at least one component selected from the group consisting of MgO and $Nb_2O_5$, in an amount sufficient to limit adhesion of the glass-ceramic composition to the fibers.

16. The process as claimed in claim 10, wherein step e) is performed by impregnating a fabric of long fibers by means of a suspension of said glass-ceramic composition in powder form in a viscous liquid, and step f) is performed on a stack of several sheets of fabric thus impregnated.

17. The process as claimed in claim 10, wherein said glass-ceramic matrix consists essentially of $SiO_2$, $Al_3O_3$, MgO and $Li_2O$.

* * * * *

UNITED STATES PATENT AND TRADEMARK OFFICE
CERTIFICATE OF CORRECTION

PATENT NO. :   5,232,877
DATED      :   August 3, 1993
INVENTOR(S):   LARNAC et al.

It is certified that error appears in the above-identified patent and that said Letters Patent is hereby corrected as shown below:

On the cover page, Item [30], "Dec. 4, 1987" should be --Dec. 4, 1989--.

Signed and Sealed this

Twenty-fourth Day of May, 1994

Attest:

BRUCE LEHMAN

Attesting Officer                Commissioner of Patents and Trademarks